United States Patent [19]

Nayak et al.

[11] Patent Number: 5,376,716
[45] Date of Patent: Dec. 27, 1994

[54] RADIATION RESISTANT POLYPROPYLENE RESINS

[75] Inventors: Kasinath Nayak; George C. Allen; Roger Merrill, all of Odessa, Tex.

[73] Assignee: Rexene Products Company, Dallas, Tex.

[21] Appl. No.: 937,563

[22] Filed: Aug. 31, 1992

[51] Int. Cl.$^5$ .............................................. C08L 23/16
[52] U.S. Cl. ................................... 524/295; 524/387; 524/528; 524/533; 524/570; 524/583; 525/306
[58] Field of Search ............... 524/295, 387, 528, 533; 525/306

[56] References Cited

U.S. PATENT DOCUMENTS

| | | | |
|---|---|---|---|
| 4,110,185 | 8/1978 | Williams et al. | 522/79 |
| 4,594,376 | 6/1986 | Hamada | 524/101 |
| 4,666,959 | 5/1987 | Weissberger et al. | 523/137 |
| 4,687,803 | 8/1987 | Teramoto et al. | 524/413 |
| 4,888,369 | 12/1989 | Moore, Jr. | 524/100 |

FOREIGN PATENT DOCUMENTS

| | | |
|---|---|---|
| 0431475 | 6/1991 | European Pat. Off. . |
| 2-292346 | 12/1990 | Japan . |

OTHER PUBLICATIONS

CA 96(8):52831y.
CA 87(24):185533p.
D. Kostoski et al. The Effect of Antioxidants on the Morphology of Gamma Irradiated Isotactic Polypropylene, Radiat. Phys. Chem. vol. 35, Nos. 1—3, pp. 190–193, 1990.
Technical Bulletin: Duraflex Polybutylene 8010, Shell Chemical Co., SC:751-87.
Cross–Linking with Radiation, Encyclopedia of Polymer Science, vol. 4, pp. 418–449.
Radiation–Resistant Polymers, Encyclopedia of Polymer Science vol. 13, pp. 667–708.

*Primary Examiner*—Mark Nagumo
*Attorney, Agent, or Firm*—Harold E. Meier

[57] ABSTRACT

A radiation resistant resin suitable for the manufacture of, for example, disposable medical supplies comprises a semicrystalline polypropylene or propylene-ethylene and from 1500 to 5000 ppm triallyl trimellitate. The resin exhibits substantially no increase in melt flow rate after irradiation to a dosage of up to 5 Mrads, and may contain up to about 5% by weight of a polybutylene and/or up to about 3000 ppm of a sorbital based clarifying agent.

12 Claims, No Drawings

RADIATION RESISTANT POLYPROPYLENE RESINS

TECHNICAL FIELD

This invention related to polyolefin resins having improved resistance to radiation.

BACKGROUND OF THE INVENTION

In recent years there has been a trend away from conventional sterilization techniques such as autoclaving or ethylene oxide treatment for sterilizing disposable equipments for hospital and medical use such as tubes, syringes, vials and the like. Rather, sterilization with ionizing radiation has evolved as a preferred method of sterilizing many types of disposable equipments for hospital use and biomedical applications. Sterilization of such articles is accomplished with a dosage of up to about 5 Mrads of gamma radiation, typically about 2.5 Mrads.

Ionizing radiation, however, can profoundly alter the molecular structure and macroscopic properties of polymeric materials such as polypropylene and propylene-ethylene copolymers that are used to manufacture disposable medical devices. In the case of polypropylene, and propylene-ethylene copolymers, exposure to ionizing radiation can result in deterioration of physical properties as evidenced by brittleness, discoloration, cracking and a loss of melt flow stability. Moreover, in the case of semicrystalline polypropylene or propylene-ethylene copolymers without an effective radiation resistant additive package, degradation of physical properties resulting from irradiation can cause a limited shelf life of the product. Consequently, there is a need for improved polypropylene blends for the production of tubes, syringes, vials and similar articles that would exhibit post-irradiation resistance to such degradation.

U.S. Pat. No. 4,888,369, issued Dec. 19, 1989 to Moore, discloses a high energy radiation resistant, polypropylene composition in which is dispersed a hindered amine component, a hindered phenolic component and a phosphorous containing component. U.S. Pat. No. 4,666,959, issued May 19, 1987 to Weissberger et al., discloses a propylene polymer molding composition which is resistant to discoloration and losses in physical properties upon sterilization by high energy radiation which comprises a blend of a propylene polymer with small amounts of a polymeric hindered amine, an alkyl phosphite and a specific phenolic antioxidant as additives.

U.S. Pat. No. 4,110,185, issued Aug. 29, 1978 to Williams et al., discloses a semicrystalline polymer article which is sterilized by radiation, the polymer having incorporated therein during the irradiation a mobilizing amount of a non-crystalline mobilizer. The preferred mobilizer is a liquid mobilizer which is not highly viscous, and in particular, a hydrocarbon oil or phthalic ester oil.

European Patent Application 90122882.5, published Dec. 6, 1991, discloses a radiation resistant polypropylene composition containing a polypropylene having a substantially syndiotactic structure and a phosphorus-containing anti-oxidant, an amine-containing anti-oxidant and/or a nucleating agent. Japanese Kokai Patent Application No. 2-292346 discloses a radiation resistant composition for nuclear reactors at 500 Mrad or higher containing at least 3 parts by weight of one of several antioxidants with a polyolefin resin. The foregoing references do not however, teach the radiation resistant polypropylene blend of the present invention.

SUMMARY OF THE INVENTION

In accordance with the present invention, a radiation resistant resin suitable for the manufacture of, for example, disposable medical supplies comprising a semicrystalline polypropylene or propylene-ethylene copolymer and from 1500 to 5000 ppm triallyl trimellitate is provided. The resin exhibits substantially no increase in melt flow rate after irradiation to a dosage of up to 5 Mrads of gamma radiation, and may contain up to about 5% by weight of a polybutylene and/or up to about 3000 ppm of a sorbitol based clarifying agent.

DETAILED DESCRIPTION

Exposing a polymer such as polypropylene to sufficient ionizing radiation triggers a complex chain of events that leads to the generation of free radicals, polymer chain scissioning and cross-linking. The scissioning and cross-linking processes are believed to occur simultaneously and are generally a function of the polymer type, with one of the two processes normally predominating. Chain scissioning has the effect of increasing the melt flow rate (MFR) as determined by ASTM method D1238, Condition L. Cross-linking has the opposite effect, lowering the melt flow rate. Thus, changes in the melt flow rate of a polymer subsequent to irradiation provide an indication of the amount of net degradation that the polymer has undergone.

Changes in the physical properties of a polymer resulting from exposure to ionizing radiation are also not always readily apparent or observable. Products formed from semicrystalline polymers, such as polypropylene and propylene-ethylene copolymers, may evidence embrittlement and discoloration weeks or months after irradiation.

In accordance with the present invention, polypropylene and propylene-ethylene copolymers are blended with a polyene and up to about 5% of a polybutylene copolymer to produce a resin blend having excellent melt flow stability, improved impact properties and increased radiation resistance. The improvement in radiation resistance is attributed to the addition of a specific polyene, triallyl trimellitate, of the formula illustrated as:

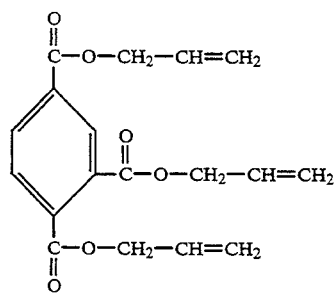

in an amount from about 1500 to about 5000 ppm. Triallyl trimellitate is available from MTM Americas Inc., Hardwicke Division, Elgin, S.C. 29045. Although the exact mechanism through which triallyl trimellitate functions to increase the radiation resistance of propylene and propylene-ethylene copolymers is unknown, it is hypothesized that the polyene serves as a free radical scavenger that immediately cross-links free radicals formed when the polymer chains are ruptured by ionizing radiation.

In addition to the polyene, a polybutene may be added to the resin in an amount of up to 5% in order to minimize the effect of irradiation on the impact strength of articles formed from the resin. One such polybutene is a butylene-ethylene copolymer commercially available from Shell Chemical Co. under the trade designation Duraflex 8010. Durflex 8010 contains about 6% ethylene, has a density of about 0.895 and a melt index of about 0.25. Additionally, a sorbitol based clarifying agent may be added in a minor amount to aid in maintaining the clarity of articles produced from the resin. A sorbitol based clarifying agent suitable for use in connection with the present invention is available from Mitsui Chemical Co. under the trade designation NC-4.

EXAMPLE 1

A semicrystalline propylene-ethylene random copolymer containing about 3% ethylene by weight and having a nominal melt flow rate of 10 g/10 min was blended with the following additives at the indicated concentrations. The individual additives are identified in the Additive Index below. The samples were extruded twice in an air environment to simulate a pelleting process followed by a molding process. The samples were irradiated to a dosage of 5 Mrads of gamma radiation and were again tested for melt flow rate, clarity [haze (%)], and color [yellowness index]. The results are set forth in Table 1 below:

TABLE 1

| | SAMPLE NUMBER | | | | |
|---|---|---|---|---|---|
| | 1 | 2 | 3 | 4 | 5 |
| ADDITIVES (ppm) | | | | | |
| 1 | 700 | 700 | 350 | 350 | 700 |
| 2 | 2000 | 2000 | 1000 | 500 | 2000 |
| 3 | 1000 | 1000 | 500 | 250 | 1000 |
| 4 | 500 | 500 | 500 | 500 | 500 |
| 5 | 250 | 250 | 250 | 250 | 250 |
| 6 | | 1000 | 3000 | 4000 | |
| 7 | | | | | 1000 |
| 8 | | | | | |
| 9 | | | | | |
| 10 | | | | | |
| 11 | | | | | |
| MELT FLOW RATE, G/10 MIN BEFORE IRRADIATION | | | | | |
| First Pass | 9.7 | 9.0 | 10.7 | 10.1 | 10.7 |
| Second Pass | 12.1 | 12.4 | 10.8 | 10.4 | 12.4 |
| Haze (%) | 72.8 | 69.5 | 69.3 | 69.5 | 67.1 |
| Yellowness Index | 4.6 | 4.5 | 4.8 | 4.9 | 4.7 |
| MELT FLOW RATE, G/10 MIN AFTER IRRADIATION | | | | | |
| @ 5.0 MRADS | 97.3 | 47.9 | 8.5 | 16.7 | 82.3 |
| Haze (%) | 72.8 | 72.1 | 71.3 | 72.1 | 68.5 |
| Yellowness Index | 5.4 | 5.1 | 5.3 | 5.1 | 5.3 |

| | SAMPLE NUMBER | | | | |
|---|---|---|---|---|---|
| | 6 | 7 | 8 | 9 | 10 |
| ADDITIVES (ppm) | | | | | |
| 1 | 700 | 700 | 700 | 700 | 700 |
| 2 | 2000 | 2000 | 2000 | 2000 | 2000 |
| 3 | 1000 | 1000 | 1000 | 1000 | 1000 |
| 4 | 500 | 500 | 500 | 500 | 500 |
| 5 | 250 | 250 | 250 | 250 | 250 |
| 6 | | | | | |
| 7 | | | | | |
| 8 | 1000 | | | | |
| 9 | | 1000 | | | |
| 10 | | | 1000 | | |
| 11 | | | | 1000 | 10000 |
| MELT FLOW RATE, G/10 MIN BEFORE IRRADIATION | | | | | |
| First Pass | 15.5 | 10.0 | 10.1 | 10.4 | 9.6 |
| Second Pass | 15.8 | 9.8 | 10.4 | 9.9 | 8.2 |
| Haze (%) | 69.3 | 69.9 | 65.5 | 74.0 | 71.9 |
| Yellowness Index | 4.6 | 4.7 | 4.7 | 4.8 | 5.0 |
| MELT FLOW RATE, G/10 MIN AFTER IRRADIATION | | | | | |
| @ 5.0 MRADS | 44.1 | 70.7 | 55.1 | 74.6 | 72.6 |
| Haze | 70.7 | 72.0 | 69.7 | 72.8 | 72.0 |
| Yellowness index | 5.5 | 5.3 | 5.3 | 5.4 | 5.5 |

Additive Index
1 - Naugard XL-1 (Uniroyal Chemical)
2 - Tinuvin 622 LD (Ciba Geigy)
3 - Weston 619 (General Electric Specialty Chemicals)
4 - Calcium Stearate
5 - DHT4A (Synthetic Dihydro Talcite) (Mitsui Chemical Co.)
6 - TAT (Triallyl Trimellitate)
7 - DAP (Diallyl Phthalate)
8 - THPAC (Trimetholpropane triacrylate)
9 - TAP (Tetraallyl Pentaerythritol)
10 - TATA (2,4,6-triallyloxy-1,3,5-triazine)
11 - Trilene
12 - NC-4 (sorbitol based clarifier)(Mitsui Chemical Co.)
13 - Shell 8010 (polybutylene copolymer)

As illustrated by the foregoing, irradiation to a dosage of 5 Mrads resulted in a substantial increase in melt flow rate for the majority of the samples, indicating degradation of the polymers. The melt flow rate of the samples containing triallyl trimellitate, however, did not increase to the levels observed in the other samples. In fact, in the case of sample No. 3 the melt flow rate actually decreased. Notably, samples 5–10, which contained polyenes other than triallyl trimellitate, evidenced substantial increases in melt flow rate.

EXAMPLE 2

A propylene-ethylene random copolymer containing about 3% ethylene by weight having a nominal melt flow rate of 10 g/10 min was blended with the additives as indicated in Table 2 below. The individual additives are identified in the Additive Index of Example 1. Samples of each of the formulations were irradiated with gamma radiation to dosages of 3.5 and 7.5 Mrads and tested in accordance with ASTM methods. Test results are set forth in Table 3 below.

TABLE 2

| ADDITIVES (ppm) | A | B | C |
|---|---|---|---|
| 1 | 700 | 700 | 700 |
| 2 | 2000 | 2000 | 2000 |
| 3 | 1000 | 1000 | 1000 |
| 4 | 500 | 500 | 500 |
| 5 | 250 | 250 | 250 |
| 6 | 3000 | 3000 | — |
| 12 | 2500 | 2500 | 2500 |
| 13 (wt %) | — | 2.5 | 5 |

TABLE 3

| | Sample Id | | | | | | | | |
|---|---|---|---|---|---|---|---|---|---|
| | A1 | A2 | A3 | B1 | B2 | B3 | C1 | C2 | C3 |
| Radiation Dosage, | 0 | 3.75 | 7.5 | 0 | 3.75 | 7.5 | 0 | 3.75 | 7.5 |

TABLE 3-continued

| | Sample Id | | | | | | | | |
|---|---|---|---|---|---|---|---|---|---|
| Mrads | A1 | A2 | A3 | B1 | B2 | B3 | C1 | C2 | C3 |
| Flex Mod, Kpsi | 157 | 161 | 162 | 152 | 159 | 159 | 144 | 146 | 144 |
| Tensile @ Yield psi | 4250 | 4347 | 4397 | 4077 | 4184 | 4244 | 3896 | 3926 | 3947 |
| Elongation @ Yield, % | 14.8 | 14.4 | 14.8 | 14.9 | 14.7 | 14.6 | 14.9 | 15.1 | 14.9 |
| Elongation @ Break, % | >700 | >700 | >586 | >700 | >700 | >700 | >700 | >700 | >700 |
| HDT @ 66 psi, °C. | 92 | 90 | 96 | 91 | 91 | 89 | 86 | 89 | 86 |
| HDT @ 264 psi, °C. | 52 | 52 | 54 | 51 | 51 | 53 | 49 | 50 | 51 |
| Izod @ 23 °C. Ft-lb/in | 1.3 | 1.1 | 1.1 | 1.4 | 1.0 | 1.1 | 1.4 | 1.4 | 1.3 |
| Melt Flow Rate (g/10 min) | 11.0 | 5.7 | 16.5 | 10.5 | 8.2 | 24.3 | 9.5 | 53.2 | 130.5 |
| Gardner Impact (50 Mil Plaque) @ 23° C., in-lbs | 31 | 2 | 1 | 35 | 19 | 1 | 99 | 54 | 6 |
| Yellowness Index | 0.2 | 3.2 | 4.9 | 0.7 | 3.5 | 5.1 | 0.2 | 3.6 | 5.2 |
| Haze (%), 25 mil | 14.3 | 15.7 | 16.0 | 15.8 | 15.6 | 16.3 | 15.1 | 15.5 | 15.9 |
| Haze (%), 50 mil | 37.2 | 40.3 | 39.5 | 40.5 | 39.9 | 42.1 | 39.1 | 41.1 | 42.3 |

Comparison of the melt flow rates obtained for samples A1–A3 and B1–B3 illustrates that the melt flow rates decreased in the samples containing triallyl trimellitate that were irradiated to a dosage of 3.75 Mrads as compared to the nonirradiated samples. Alternatively, the melt flow rate of sample C2, which did not contain triallyl trimellitate, increased substantially compared to the nonirradiated sample. In the case of the samples irradiated to 7.5 Mrads, the melt flow rate of samples A3 and B3, which contained triallyl trimellitate, increased by factors of 0.5 and 1.3 respectively, whereas the melt flow rate of sample C3 increased by a factor of 12.7.

The above Example also indicates that the effect of irradiation on Gardner Impact strength can be controlled by the addition of a small amount of a polybutylene. The particular polybutylene used in the above Example is a butylene-ethylene copolymer commercially available from Shell Chemical Co. under the trade designation Duraflex 8010. Durflex 8010 contains about 6% ethylene, has a density of about 0.895 and a melt index of about 0.25. Comparison of samples A2 and B2 illustrates that the addition of 2.5 wt % of Duraflex 8010 substantially reduced the decrease in Gardner Impact strength resulting from a dose of 3.5 Mrads of gamma radiation.

Example 2 also illustrates that the clarity of samples formed from the resin blends can be maintained after irradiation up to 7.5 Mrads through the addition of a minor amount of a sorbitol based clarifying agent. The particular clarifying agent used in Example 2 is commercially available from Mitsui Chemical Co. under the trade designation NC-4.

While particular embodiments of the present invention have been illustrated and described, it will be apparent to those skilled in the art that various changes and modifications may be made without departing from the spirit and scope of the invention.

We claim:

1. A polymer composition comprising:
   a semicrystalline polymer selected from the group consisting of semicrystalline polypropylene and propylene-ethylene copolymers, the polymer having a melt flow rate of from 1 to 15 g/10 min; and
   from 1500 to 5000 ppm triallyl trimellitate;
   the polymer composition exhibiting substantially no increase in melt flow rate after irradiation in a solid phase with ionizing radiation up to a dosage of 5 Mrads.

2. The polymer composition of claim 1 further comprising up to about 5% by weight of a polybutylene.

3. The polymer composition of claim 1 further comprising up to about 3000 ppm of a sorbitol based clarifying agent.

4. The polymer composition of claim 1 further comprising a semicrystalline propylene-ethylene random copolymer containing from about 2% to about 8% ethylene by weight.

5. A polymer composition comprising:
   a semicrystalline propylene-ethylene copolymer having an ethylene content of from about 2% to about 6% by weight and having a melt flow rate of from 2 to 10 g/10 min; and
   from 1500 to 5000 ppm triallyl trimellitate;
   the polymer composition exhibiting substantially no increase in melt flow rate after irradiation in a solid phase with ionizing radiation up to a dosage of 5 Mrads.

6. The polymer composition of claim 5 further comprising up to about 5% by weight of a polybutylene.

7. The polymer composition of claim 5 further comprising up to about 3000 ppm of a sorbitol based clarifying agent.

8. A polymer composition comprising:
   a semicrystalline propylene-ethylene copolymer having an ethylene content of from about 2% to about 6% by weight and having melt flow rate of from 2 to 10 g/10 min;
   from about 1% to about 5% by weight of a polybutylene; and
   from 1500 to 5000 ppm triallyl trimellitate;
   the polymer composition exhibiting substantially no increase in melt flow rate after irradiation in a solid phase with ionizing radiation up to a dosage of 5 Mrads.

9. A polymer composition comprising:
   a semicrystalline polymer selected from the group consisting of semicrystalline polypropylene and propylene-ethylene copolymers, the polymer having a melt flow rate of from 1 to 15 g/10 min; and
   from 1500 to 5000 ppm triallyl trimellitate;
   the polymer composition exhibiting substantially no increase in melt flow rate after irradiation in a solid phase with ionizing radiation up to a dosage of 5 Mrads, the polymer composition further having a tensile elongation after irradiation to a dosage of 3.75 Mrads of greater than 700%.

10. The polymer composition of claim 9 further comprising up to about 5% by weight of a polybutylene.

11. The polymer composition of claim 9 further comprising up to about 3000 ppm of a sorbitol based clarifying agent.

12. The polymer composition of claim 9 further comprising a semicrystalline propylene-ethylene random copolymer containing from about 2% to about 8% ethylene by weight.

* * * * *